(12) United States Patent
Dixon et al.

(10) Patent No.: US 9,118,633 B2
(45) Date of Patent: Aug. 25, 2015

(54) TOPIC PROTECTION POLICY FOR PUBLISH-SUBSCRIBE MESSAGING SYSTEM

(71) Applicant: International Business Machines Corporation, Armonk, NY (US)

(72) Inventors: Bret W. Dixon, Perth (AU); Jonathan L. Rumsey, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 149 days.

(21) Appl. No.: 13/920,139

(22) Filed: Jun. 18, 2013

(65) Prior Publication Data
US 2014/0372748 A1 Dec. 18, 2014

(51) Int. Cl.
*H04L 29/06* (2006.01)
*H04L 9/32* (2006.01)
*H04L 29/08* (2006.01)
*H04L 12/24* (2006.01)

(52) U.S. Cl.
CPC .......... *H04L 63/0435* (2013.01); *H04L 9/3247* (2013.01); *H04L 63/0471* (2013.01); *H04L 67/10* (2013.01); *H04L 12/244* (2013.01); *H04L 2463/041* (2013.01)

(58) Field of Classification Search
CPC .................................................... H04L 12/244
USPC ........................................................ 713/153
See application file for complete search history.

(56) References Cited

U.S. PATENT DOCUMENTS

| 2002/0138735 | A1* | 9/2002 | Felt et al. ................... 713/176 |
| 2004/0139018 | A1* | 7/2004 | Anderson et al. ............... 705/41 |
| 2005/0204139 | A1  | 9/2005 | Helland et al. |
| 2013/0246791 | A1* | 9/2013 | Di Crescenzo ............... 713/168 |

OTHER PUBLICATIONS

Ion et al., "Providing Confidentiality in Content-Based Publish/Subscribe Systems", <http://ieeexplore.ieee.org/xpl/login.jsp?tp=&arnumber=5741700&url=http%3A%2F%2Fieeexplore.ieee.org%2Fxpls%2Fabs_all.jsp%3Farnumber%3D5741700>.
Tariq et al., "Providing basic security mechanisms in broker-less publish/subscribe systems", DEBS'10, Jul. 12-15, 2010, Cambridge, UK. Copyright 2010 ACM 978-1-60558-927-May 10, 2007.
U.S. Appl. No. 14/490,858, entitled "Topic Protection Policy for Publish-Subscribe Messaging System", filed Sep. 19, 2014.

* cited by examiner

*Primary Examiner* — Jacob Lipman
(74) *Attorney, Agent, or Firm* — Isaac J. Gooshaw

(57) ABSTRACT

Exemplary embodiments of the present invention disclose a method and system for securing a message published to a topic by a publisher in a publish-subscriber messaging system with a topic policy for the topic. In a step, an exemplary embodiment establishes a topic policy for a topic. In another step, an exemplary embodiment associates a message published to the topic with a topic policy. In another step, an exemplary embodiment signs a message published to the topic by a publisher with a private key of the publisher if the topic policy directs. In another step, an exemplary embodiment provides a public key of a subscriber if the topic policy directs that the subscriber receive a message in encrypted form. In another step, an exemplary embodiment encrypts a message for a subscriber specified in a topic policy to receive the message encrypted with a public key of the subscriber.

13 Claims, 5 Drawing Sheets

TOPIC PROTECTION POLICY FOR PUBLISH-SUBSCRIBE MESSAGING SYSTEM

FIELD OF THE INVENTION

The present invention relates generally to data distribution systems and more specifically to authentication and security issues related to the access of information that has been categorized into topics in topic-based publish-subscribe messaging systems.

BACKGROUND

A publish-subscribe messaging system is a data distribution system that connects a set of publishers to a set of subscribers. Senders of messages, called publishers, have no knowledge of specific receivers, called subscribers, which consume their messages. The messages of publishers are categorized into classes (topics) and subscribers receive the messages in the classes that they are interested in without knowledge of who the publishers are. In the publish-subscribe model, subscribers typically receive only a subset of the total messages published. The process of selecting messages for reception and processing is called filtering. There are two common forms of filtering: topic-based and content-based. In a topic-based system, messages are published to "topics" or named logical channels. Subscribers in a topic-based system will receive all messages published to the topics to which they subscribe, and all subscribers to a topic will receive the same messages. The publisher is responsible for defining the classes of messages to which subscribers can subscribe. In a content-based system, messages are only delivered to a subscriber if the attributes or content of those messages match constraints defined by the subscriber. The subscriber is responsible for classifying the messages in a content-based system.

Subscribers to a publish-subscribe messaging system may be classified into durable and non-durable subscribers. A durable subscriber is a message consumer that receives all messages published on a topic, including those published while the subscriber is not connected. The messaging server, often called a broker, maintains a record of the durable subscription and ensures that all messages published on the topic are retained until they are acknowledged by the durable subscriber or they expire. A non-durable subscriber is a message consumer that only receives messages that are published while the subscriber is connected. Messages delivered while the non-durable subscriber is not connected are lost.

Topics are typically organized into a tree data structure (root at the top and leaves at the bottom) in which a given topic is represented by a node and may be a subtopic of another topic that is higher in a tree. Access to topics in a tree of topics is controlled by administration nodes in the tree that control access to the topic nodes below them. An administration node includes an authentication function that determines whether a specific user has an authority to access the messages in and/or publish to a topic node that is below the administration node in a tree, i.e., farther from the root of the tree than the administration node. Security is a major issue associated with publish-subscribe systems. Efficient ways to authenticate messages posted by publishers, i.e., prove that a publisher of a message is the publisher that is claimed, and the securing of selected messages by means of encryption are active areas of research.

SUMMARY

Exemplary embodiments of the present invention disclose a method and system for securing a message published to a topic by a publisher in a publish-subscriber messaging system with a topic policy for the topic. In a step, an exemplary embodiment establishes a topic policy for a topic. In another step, an exemplary embodiment associates a message published to the topic with a topic policy. In another step, an exemplary embodiment signs a message published to the topic by a publisher with a private key of the publisher if the topic policy directs. In another step, an exemplary embodiment provides a public key of a subscriber if the topic policy directs that the subscriber receive a message in encrypted form. In another step, an exemplary embodiment encrypts a message for a subscriber specified in a topic policy to receive the message encrypted with a public key of the subscriber.

DETAILED DESCRIPTION

Figure 1:
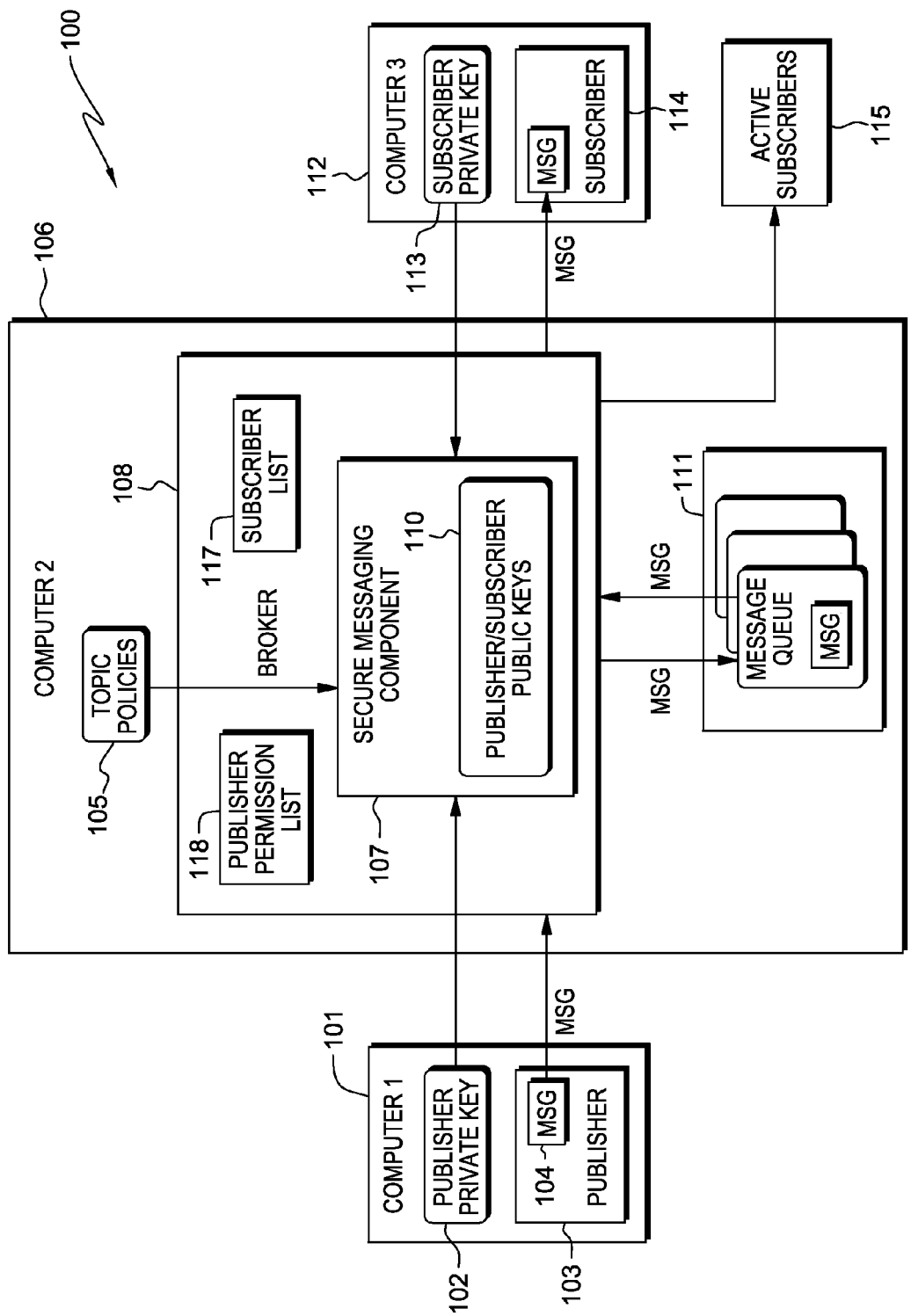
FIG. 1 is a block diagram of a publication subscription system with a topic protection policy for the topic, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

FIG. 1 depicts an exemplary embodiment publication subscription system in accordance with an embodiment of the present invention. Publisher 103, executing in computer 101, publishes message 104 by sending message 104 to broker 108 that is executing in computer 106. Broker 108 has a list of valid publishers, in publisher permission list 118, a set of topic policies in topic policies 105, and a list of valid subscribers in subscriber list 117. A topic policy includes a topic and a policy associated with the topic that specifies a set of actions that broker 108 performs during a publication to a subscriber of a message that is associated with the topic. The policy includes a list of subscribers to the topic and specifies whether a message published to the topic should be encrypted. A message is associated with a topic and further associated with a topic policy if a content of the message is classified by broker 108 to a topic of a topic policy in topic policies 105. Topic policies 105 may not include a topic policy for a possible topic and a content of a message may be classified to a topic by broker 108 that is not associated with a topic policy in topic policies 105. Broker 108 stores a public encryption key in publisher/subscriber public keys 110 of a subscriber listed in a topic policy that is in topic policies 105. Broker 108 classifies message 104 to a topic and accesses topic policies 105 to determine if there is a topic policy in topic policies 105 that is associated with the topic.

If broker 108 classifies message 104 to a topic that is not associated with a topic policy in topic policies 105, message 104 is placed in message queue 111 and broker 108 notifies all active subscribers to the topic that message 104 has been published. An active subscriber to a topic is a subscriber that receives a notification of only those publications to the topic that are published during a time in which the subscriber is active. An active subscriber to a topic notifies broker 108 that the active subscriber is active. A subscriber that is named in a topic policy of a topic is a durable subscriber and receives notification of a publication to the topic of a message regardless of whether the durable subscriber is active or not. If a subscriber to a topic is both a durable subscriber to the topic and an active subscriber to the topic, the subscriber is treated by broker 108 as a durable subscriber to the topic and not as an active subscriber to the topic.

If broker 108 classifies message 104 to a topic that is associated with a topic policy in topic policies 105, broker 108 validates publisher 103 by searching for publisher 103 in publisher permission list 118 and determining if publisher 103 has permission to publish to the topic. If publisher 103 is not in publisher permission list 118, publisher 103 is an invalid publisher and an error is generated and logged by broker 108. If publisher 103 is found in publisher permission list 118, broker 108 accesses the topic policy to determine if message 104 should be signed, and if so, secure messaging component 107 of broker 108 requests publisher private key 102 from publisher 103 and signs message 104 with publisher private key 102 of publisher 103. Broker 108 determines if message 104 should be encrypted for each durable subscriber to the topic by accessing the topic policy. A topic policy contains an identification of all durable subscribers to a topic associated with the topic policy and specifies whether a specific durable subscriber to the topic should receive a message published to the topic encrypted with the durable subscriber's public encryption key or should receive the message unencrypted. There are many possible encryption techniques that can be employed in accordance with techniques of the present invention and an example encryption method is employed in the exemplary embodiment. Broker 108 extracts a name of durable subscriber 114 to the topic from the topic policy and inserts it into subscriber list 117. Broker 108 adds a name of each active subscriber in active subscribers 115 to the topic to subscriber list 117. If the topic policy specifies that message 104 should be encrypted for subscriber 114, secure messaging component 107 of broker 108 encrypts message 104 with a public encryption key of subscriber 114 that is in publisher/subscriber public keys 110. Broker 108 then places message 104, which is encrypted if an encryption is specified by the topic policy and is not encrypted otherwise, into message queue 111 and notifies subscribers to the topic on subscriber list 117 which includes subscriber 114 and active subscribers 115.

When subscriber 114 is notified that message 104 has been published by broker 108 by placing message 104 in message queue 111, subscriber 114 asks broker 108 for the message, which secure messaging component 107 decrypts with subscriber private key 113 of subscriber 114 and message 104 is delivered to subscriber 114 by broker 108.

Figure 2:
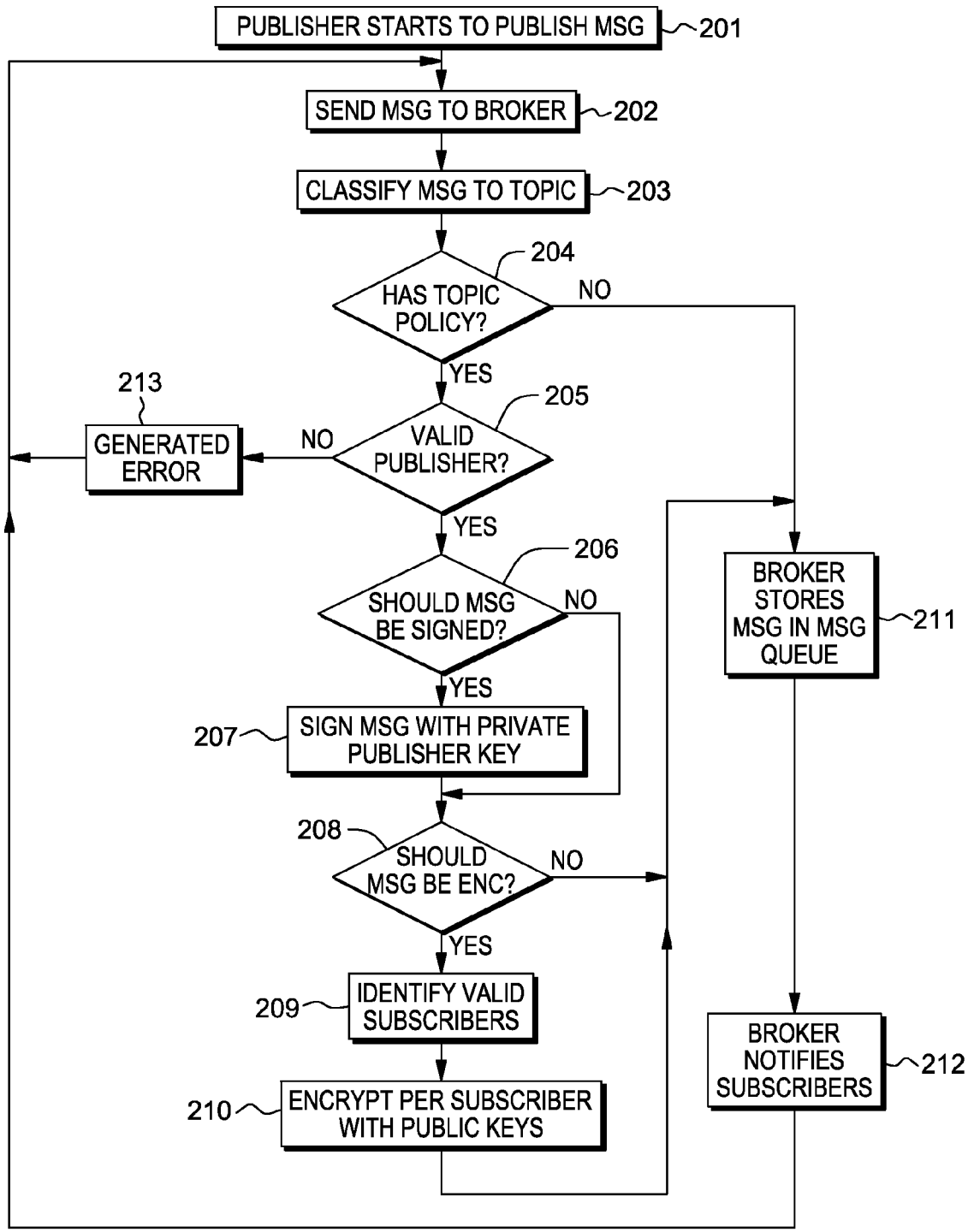
FIG. 2 depicts a flow chart that shows a publication of a message, in accordance with an embodiment of the present invention.

FIG. 2 is a flow chart depicting a publishing of message 104 from publisher 103 by broker 108. Publisher 103 decides to publish message 104 in step 201 and sends message 104 to broker 108 in step 202. Broker 108 classifies a content of message 104 to a topic in step 203 and searches topic policies 105 for a topic policy associated with the topic in decision step 204. If a topic policy is not found in decision step 204, broker 108 stores message in message queue 111 in step 211 and notifies subscriber 114 and other active subscribers 115 in step 212 that message 104 has been published. If a topic policy is found in decision step 204, broker 108 validates publisher 103 in decision step 205 by determining if publisher 103 is in publisher permission list 118 and has permission to publish to the topic. If publisher 103 is not in publisher permission list 118, publisher 103 is not a valid publisher, and broker 108 generates and logs an error in step 213 and waits for another message from a publisher. If publisher 103 is in publisher permission list 118, broker 108 queries the topic policy in decision step 206 to determine if message 104 should be signed by publisher 103. If message 104 should be signed by publisher 103, broker 108 signs message 104 with publisher private key 102 in step 207. Broker 108 determines if message 104 should be encrypted in decision step 208 by querying the topic policy for message 104 in topic policies 105. If message 104 is specified to be not encrypted, broker 108 stores message 104 in message queue 111 in step 211 and in step 212 notifies durable and active subscribers to message 104 that message 104 has been published. If message 104 is specified to be encrypted, broker 108 identifies valid subscribers, that are valid durable subscribers or valid active subscribers, for an encrypted message 104 in step 209, encrypts message 104 for each valid durable subscriber with each corresponding valid durable subscriber's public key in step 210, stores each encrypted message 104 in message queue 111 in step 211, and notifies valid durable subscribers and active subscribers in step 212 that message 104 has been published.

Figure 3:
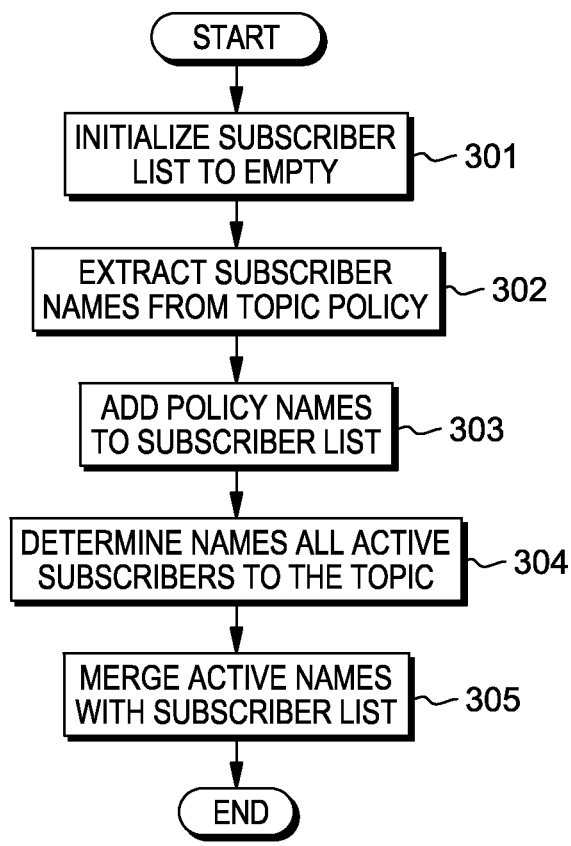
FIG. 3 depicts a flow chart that shows an identification of valid subscribers, in accordance with an embodiment of the present invention.

A detail of step 209, identify valid subscribers, is presented in a flow chart in FIG. 3. To identify valid subscribers to a topic with a topic policy, broker 108 initializes subscriber list 117 to empty in step 301 and extracts zero or more names of durable subscribers to the topic from the topic policy in step 302. All names extracted from the topic policy in step 302 are added to subscriber list 117 in step 303 and a name of zero or more active subscribers to the topic are identified in step 304 and are added to subscriber list 117 in step 305.

Figure 4:
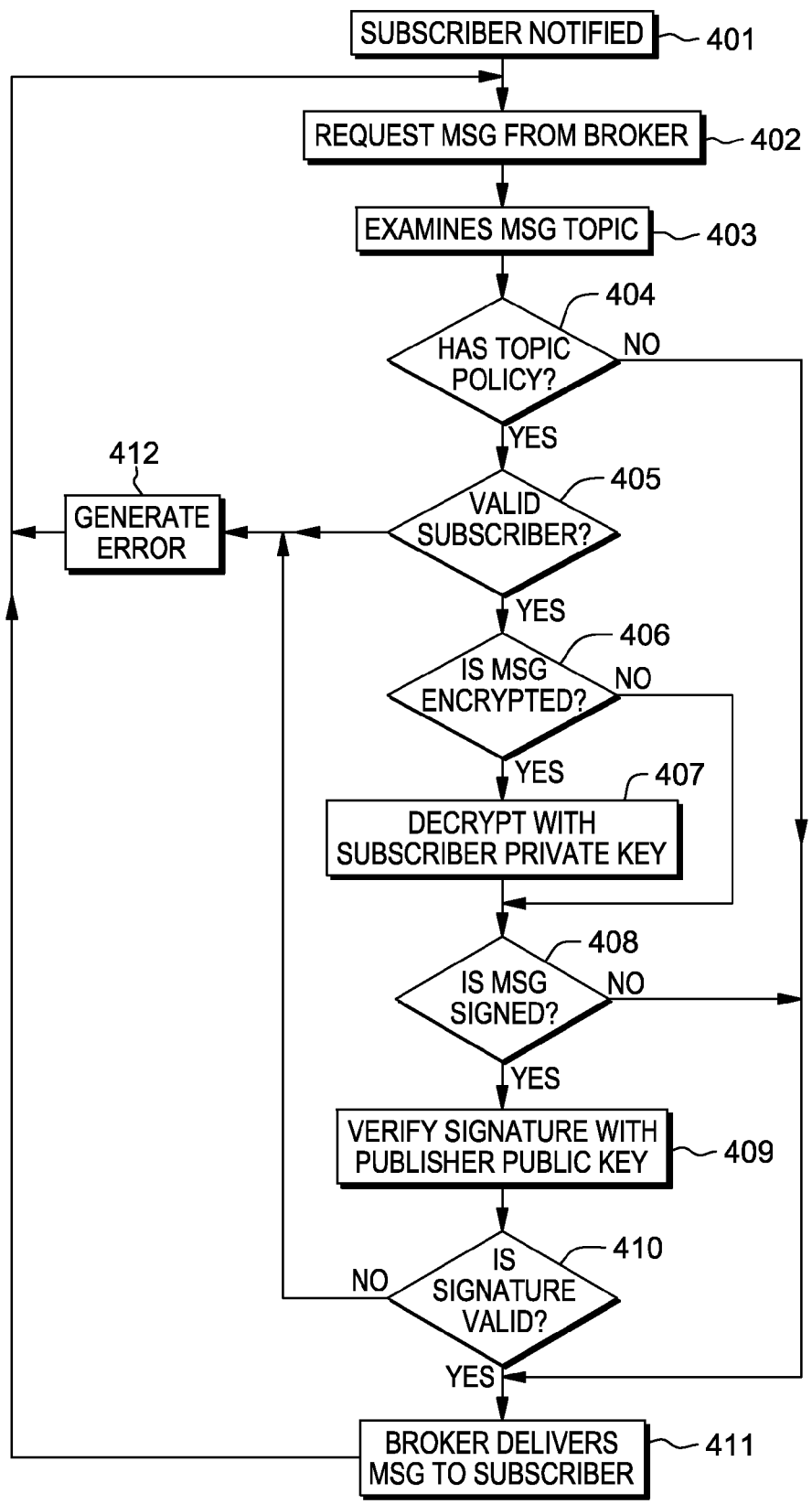
FIG. 4 depicts a flow chart that shows a delivery of a message to a subscriber, in accordance with an embodiment of the present invention.

FIG. 4 is a flow diagram of actions taken by broker 108 when subscriber 114 requests message 104 from broker 108 after subscriber 114 has been notified that message 104 has been published in step 401. In step 402, subscriber 114 requests message 104 from broker 108. Broker 108 examines a topic of message 104 in step 403 and in decision step 404 determines if there is a topic policy in topic policies 105 for the topic. If there is no topic policy in topic policies 105 for the topic, and subscriber 114 is an active subscriber, broker 108 delivers message 104 to subscriber 114 in step 411. If there is a topic policy in topic policies 105 for the topic, broker 108 queries the topic policy to determine if subscriber 114 is a valid durable subscriber to the topic in decision step 405. If subscriber 114 is not a valid durable subscriber and not an active subscriber, broker 108 generates and logs an error in step 412 and then waits for another request from a subscriber. If subscriber 114 is a valid durable subscriber, broker 108 queries the topic policy to determine if message 104 is encrypted in decision step 406. If message 104 is encrypted, broker 108 decrypts message 104 with private key 113 of subscriber 114 in step 407. If message 104 is not encrypted broker 108 proceeds from step 408. In decision step 408 broker 108 queries the topic policy to determine if message 104 is signed with publisher private key 102. If message 104 is not signed with publisher private key 102, broker 108 delivers message 104 to subscriber 114 in step 411. If message 104 is signed with publisher private key 102, broker 108 verifies a signature of message 104 with a public key of publisher 103 that is in publisher/subscriber public keys 110 in step 409. If the signature is determined to be valid in step 410, broker 108 delivers message 104 to subscriber 114 in step 411 and waits for another request from a subscriber. If the signature is not valid, broker 108 generates and logs an error in step 412 and waits for another request from a subscriber.

Figure 5:
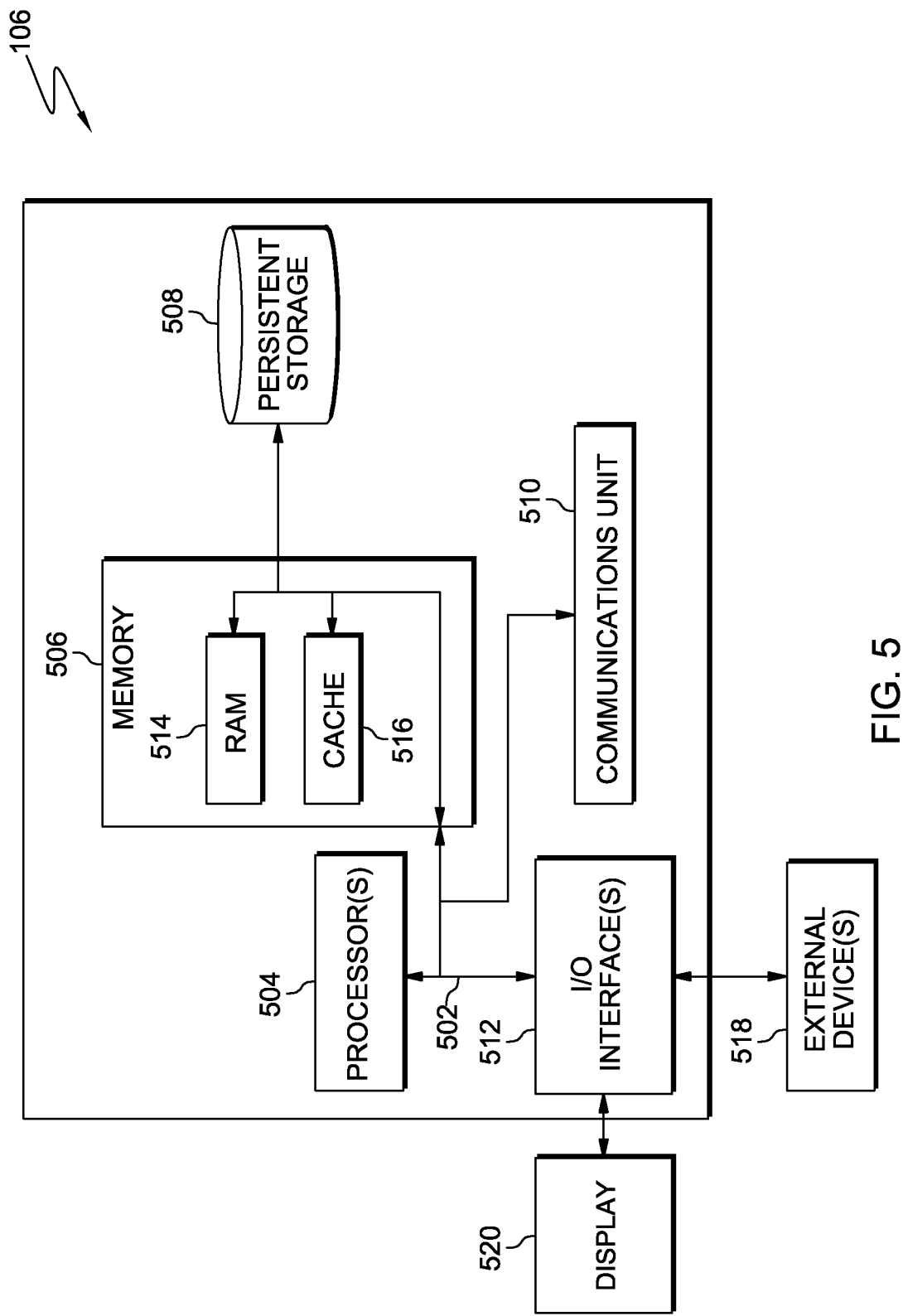
FIG. 5 depicts a block diagram of components of a computing device, in accordance with an embodiment of the present invention.

FIG. 5 depicts a block diagram of components of computer system 106 in accordance with an illustrative embodiment of the present invention. FIG. 5 can also depict computer system 101 and computer system 112 as well as computer system 106. It should be appreciated that FIG. 5 provides only an illustration of one implementation and does not imply any limitations with regard to the environments in which different embodiments may be implemented. Many modifications to the depicted environment may be made.

Computer system 106 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Broker 108 is stored in persistent storage 508 for execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of computer system 106. In these examples, communications unit 510 includes one or more network interface cards. Communications unit 510 may provide communications through the use of either or both physical and wireless communications links. Broker 108 may be downloaded to persistent storage 508 through communications unit 510.

I/O interface(s) 512 allows for input and output of data with other devices that may be connected to computer system 106. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., broker 108 can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer system for securing a message published to a topic by a publisher and accessed by a subscriber in a publish-subscriber messaging system with a topic policy for the topic, the computer system comprising:
   one or more processors, one or more computer-readable memories, one or more computer-readable tangible storage devices, and program instructions stored on at least one of the one or more storage devices for execution by at least one of the one or more processors via at least one of the one or more memories, the program instructions comprising:
   program instructions to establish a topic policy for a topic, wherein the topic policy specifies a set of actions to be performed for publication of one or more messages of the topic to a subscriber of the topic, and wherein the subscriber is specified in the topic policy;
   program instructions to associate a message published to the topic by a publisher with the topic policy;
   program instructions to sign the message published to the topic with an encryption key of the publisher if directed by the topic policy;
   program instructions to provide an encryption key of the subscriber to the topic if the topic policy directs that the subscriber receive the message published to the topic in encrypted form; and
   program instructions to encrypt the message published to the topic for the subscriber such that the message is in encrypted form when received by the subscriber.

2. The computer system of claim 1, wherein program instructions to associate, sign, provide, and encrypt are performed by a broker.

3. The computer system of claim 1, wherein program instructions establish a topic policy for a plurality of topics.

4. The computer system of claim 1, further comprising program instructions to discard a topic policy for a topic based on at least one of a frequency of accesses to a plurality of messages published to the topic and a frequency of messages published to the topic.

5. The computer system of claim 1, wherein program instructions establish a topic policy for at least one of a topic and a publisher.

6. The computer system of claim 1, further comprising programming instructions to maintain a list of valid subscribers to a topic and a list of valid publishers for a topic.

7. The computer system of claim 6, wherein the list of valid subscribers includes a specification for a valid subscriber as to whether a message for the valid subscriber is encrypted.

8. A computer program product for securing a message published to a topic by a publisher and accessed by a subscriber in a publish-subscriber messaging system with a topic policy for the topic, the computer program product comprising:
   one or more computer-readable storage devices and program instructions stored on at least one of the one or more tangible storage devices, the program instructions comprising:
   program instructions to establish a topic policy for a topic, wherein the topic policy specifies a set of actions to be performed for publication of one or more messages of the topic to a subscriber of the topic, and wherein the subscriber is specified in the topic policy;
   program instructions to associate a message published to the topic by a publisher with the topic policy;
   program instructions to sign the message published to the topic with an encryption key of the publisher if directed by the topic policy;
   program instructions to provide an encryption key of the subscriber to the topic if the topic policy directs that the subscriber receive the message published to the topic in encrypted form; and
   program instructions to encrypt the message published to the topic for the subscriber such that the message is in encrypted form when received by the subscriber.

9. The computer program product of claim 8, wherein program instructions to associate, sign, provide, and encrypt are performed by a broker.

10. The computer program product of claim 8, wherein program instructions establish a topic policy for a plurality of topics.

11. The computer program product of claim 8, further comprising program instructions to discard a topic policy for a topic based on at least one of a frequency of accesses to a plurality of messages published to the topic and a frequency of messages published to the topic.

12. The computer program product of claim 8, wherein program instructions establish a topic policy for at least one of a topic and a publisher.

13. The computer program product of claim 8, further comprising programming instructions to maintain a list of valid subscribers to a topic and a list of valid publishers for a topic.

\* \* \* \* \*